(12) United States Patent (10) Patent No.: US 9,227,359 B2
Li et al. (45) Date of Patent: Jan. 5, 2016

(54) SYSTEM AND METHOD FOR MANUFACTURING CUSTOM-FIT THREE-DIMENSIONAL ARTIFICIAL NAILS

(71) Applicants: Yong Li, LaSalle (CA); Kefei Wang, Beijing (CN); Yinhong Zhao, Beijing (CN)

(72) Inventors: Yong Li, LaSalle (CA); Kefei Wang, Beijing (CN); Yinhong Zhao, Beijing (CN)

( * ) Notice: Subject to any disclaimer, the term of this patent is extended or adjusted under 35 U.S.C. 154(b) by 378 days.

(21) Appl. No.: 13/731,205

(22) Filed: Dec. 31, 2012

(65) Prior Publication Data

US 2014/0183769 A1 Jul. 3, 2014

(51) Int. Cl.
| | |
|---|---|
| *A45D 31/00* | (2006.01) |
| *B29C 51/46* | (2006.01) |
| *B29C 51/08* | (2006.01) |
| *B29C 51/42* | (2006.01) |
| *B29C 43/02* | (2006.01) |
| *B29C 43/36* | (2006.01) |
| *B29C 43/58* | (2006.01) |

(52) U.S. Cl.
CPC .............. *B29C 51/46* (2013.01); *A45D 31/00* (2013.01); *B29C 43/021* (2013.01); *B29C 51/082* (2013.01); *B29C 51/428* (2013.01); *B29C 2043/3615* (2013.01); *B29C 2043/5825* (2013.01)

(58) Field of Classification Search
CPC ....... A45D 31/00; B29C 51/00; B29C 51/002
See application file for complete search history.

(56) References Cited

U.S. PATENT DOCUMENTS

| 3,722,104 | A * | 3/1973 | Enzetti ............................ 33/512 |
| 7,123,983 | B2 * | 10/2006 | Yogo et al. .................... 700/182 |
| 2009/0092310 | A1* | 4/2009 | Gifford et al. ................. 382/141 |
| 2012/0132221 | A1* | 5/2012 | Kergosien ........................ 132/73 |

\* cited by examiner

*Primary Examiner* — Galen Hauth
(74) *Attorney, Agent, or Firm* — Howard & Howard Attorneys PLLC

(57) ABSTRACT

A system and method is provided for quickly and accurately creating custom-fit artificial nails by introducing a secondary shaping process to pre-made nail blanks by using thermoforming method with appropriate nail tooling. The method includes measuring a natural nail and using this information to select a matching, or, close to matching, nail blank and a mold where the nail blank is thermoformed in the mold to match substantially the size and shape of the natural nail. The options available in combining pre-made nail blanks with further thermoforming allows for accommodating a wide variety of shapes and sizes of natural nails. The system and method offers the advantage of safely producing custom-fit artificial nails, which fit properly on user's natural nails within a short period of time. The system is advantageously small and suitable for use inside a nail salon.

6 Claims, 7 Drawing Sheets

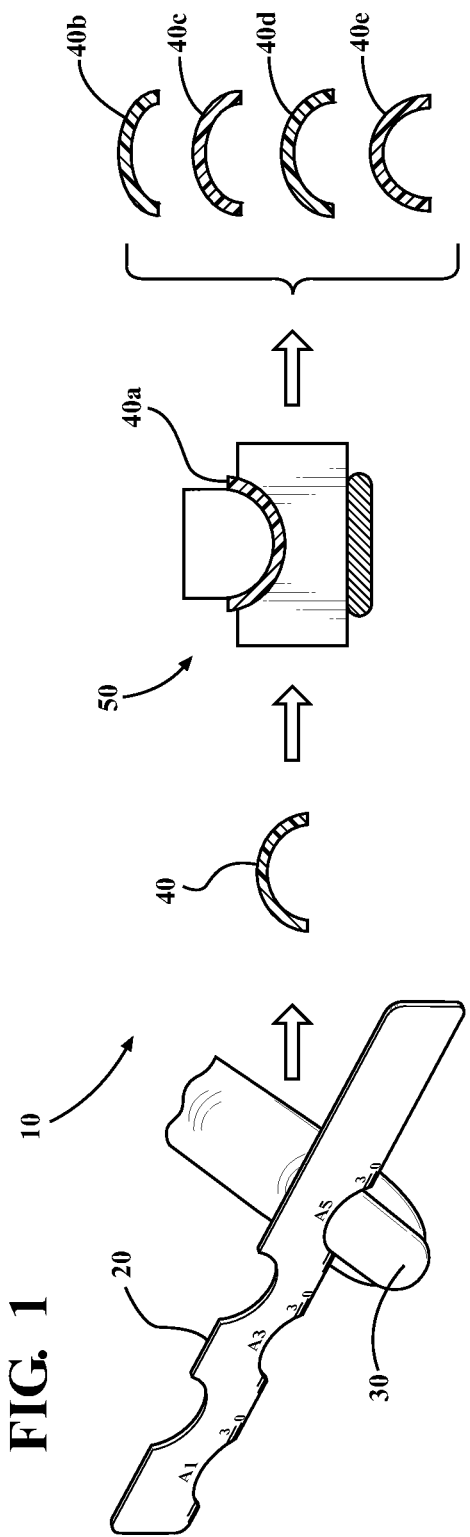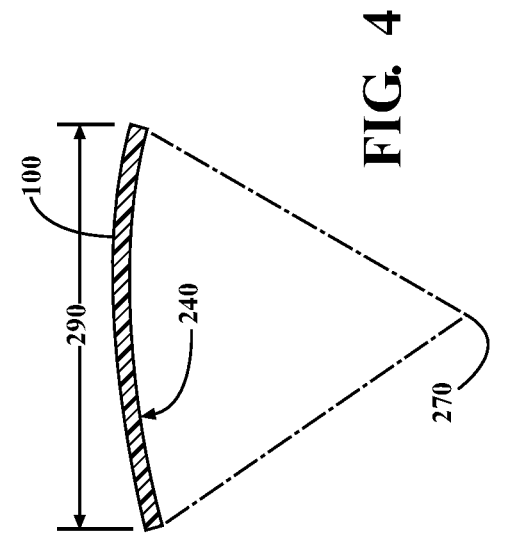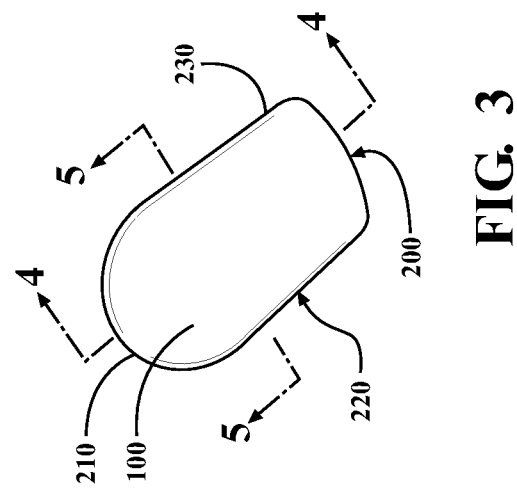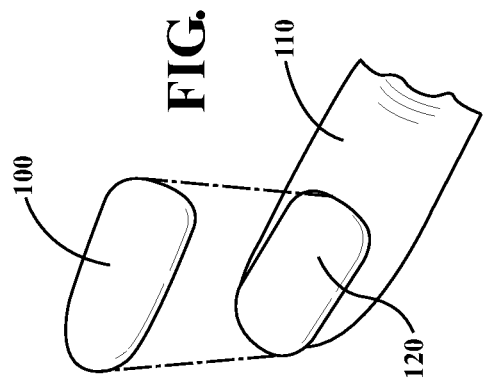

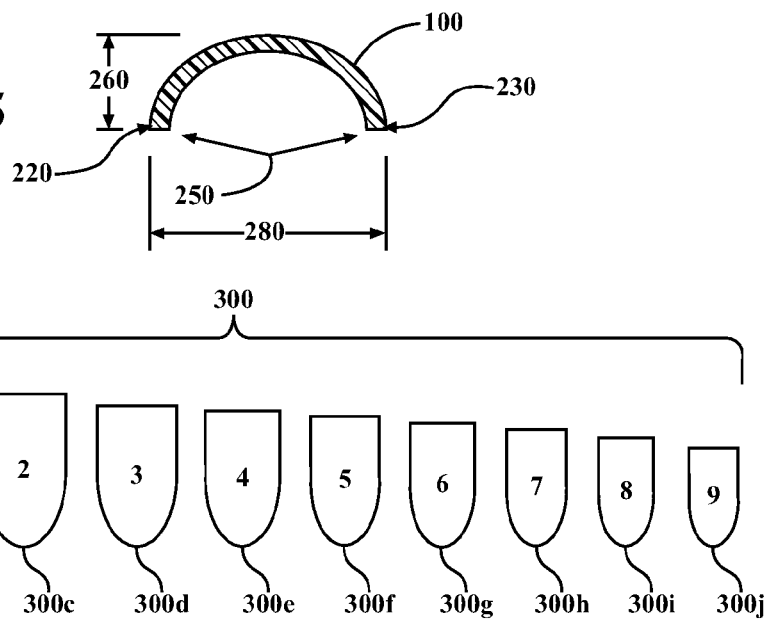
FIG. 5
FIG. 6
| Nail Blank Object Number | 0 | 1 | 2 | 3 | 4 | 5 | 6 | 7 | 8 | 9 |
|---|---|---|---|---|---|---|---|---|---|---|
| Width (mm) | 13 | 11.5 | 11 | 10.5 | 10 | 9 | 8.5 | 7.5 | 7 | 6.5 |
| Arch Height (mm) | 5 | 4.75 | 4.5 | 4.25 | 4 | 3.75 | 3.5 | 3.3 | 3.25 | 3.25 |
| Length (mm) | 26 | 25 | 24 | 23 | 22 | 21 | 19.5 | 18.5 | 17 | 16 |
| Radius of Curvature (mm) | 6.7 | 5.85 | 5.6 | 5.34 | 5.12 | 4.6 | 4.33 | 3.8 | 3.5 | 3.2 |
FIG. 7
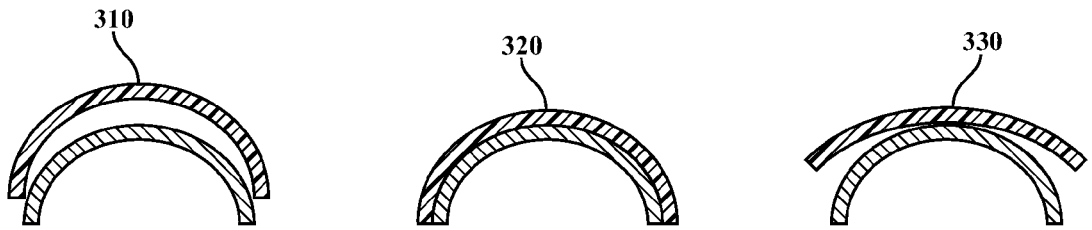
FIG. 8   FIG. 9   FIG. 10

| A1<br>W19,H5,R11.5 | C1<br>W16,H5.5, R8.6 | E1<br>W14,H4.7, R7.6 | G1<br>W12,H3.9, R6.6 | J1<br>W10,H3.1, R5.6 |
|---|---|---|---|---|
| A3<br>W18.5,H5.4, R10.6 | C3<br>W15.5, H5.5, R8.2 | E3<br>W13.5, H4.7, R7.2 | G3<br>W11.5, H3.9, R6.2 | J3<br>W9.5, H3.1, R5.2 |
| A5<br>W18.5,H5.9, R9.8 | C5<br>W15, H5.7, R7.8 | E5<br>W13, H4.8, R6.8 | G5<br>W11, H4, R5.8 | J5<br>W9, H3.2, R4.8 |
| A7<br>W17.5,H6.4, R9.2 | C7<br>W14.5, H5.9, R7.4 | E7<br>W12.5, H5, R6.4 | G7<br>W10.5, H4, R5.4 | J7<br>W8.5, H3.2, R4.4 |
| A9<br>W17,H6.6, R8.8 | C9<br>W14, H6.2, R7.0 | E9<br>W12, H5.5, R6.0 | G7<br>W10, H4.5, R5.0 | J9<br>W8, H3.5, R4.0 |

SYSTEM AND METHOD FOR MANUFACTURING CUSTOM-FIT THREE-DIMENSIONAL ARTIFICIAL NAILS

FIELD OF THE INVENTION

The present invention generally relates to the field of manufacturing custom-fit three-dimensional ("3D") artificial nails including fingernails and toenails. The invention more specifically relates to a system and method for creating custom-fit artificial nails by introducing a secondary shaping process to pre-made artificial nail blanks by using a thermoforming method and including use of appropriate tooling.

BACKGROUND OF THE INVENTION

Artificial fingernails and toenails (collectively "nails") are applied on top of natural nails as a desirable fashion accessory. There are several ways to create artificial nails, such as acrylic nails, gel nails, nail wraps, and full-coverage pre-made nail tips. In order to maximize appearance, durability and comfort on the wearer's finger or toes, it is desirable that the artificial nails fit a user's natural nails properly both in size and shape (where shape includes the contour of the nail). However, the size and shape of a natural nail, for example a fingernail, varies from one finger to another and from one person to another person. Properly fitting an artificial nail onto each of a wide variation of shapes and sizes of natural nails is challenging.

Customized methods, such as acrylic nails and gel nails, are made directly onto each natural finger to fit the exact contour and dimensions of natural nails. However, these custom-made methods are very labor intensive and time consuming. Acrylic nails and gel nails are not re-usable. Once applied, acrylic nails and gel nails will stay on a natural finger all the time until the user takes action to dissolve them into acetone. In addition, the growth of a natural nail will create a gap between its cuticle and the artificial nail, which needs to be filled regularly. Use of acrylic nails and gel nails also creates some health concerns since these materials and their methods of application expose both the user and nail technician to chemical fumes and filing debris. In addition, having a natural nail covered by an artificial nail constantly for a long period of time can seriously damage the nail bed and hamper natural nail growth.

As an alternative to the above-described customized methods, pre-made full-cover nail tips can be applied and removed easily. However, mass-produced nail tips are not customized to a certain user. They are typically made in limited sizes, shapes and styles, and sold in packages containing ten or more nail tips in different sizes, shapes and styles. It is impractical to use an injection molding method to mass-produce artificial nails with massive variations in widths, arch heights, and curvatures that can accommodate all natural nails. As a result, manufactures typically produce a set of pre-formed artificial nails, which has varying widths with a set degree of curvatures. However, a user frequently finds that the available pre-made and pre-packaged nail tips are inadequate to provide the user a proper-fitting artificial nail for each finger. As a consequence, the artificial nails are usually forced into conformity with the contours of the natural nail and then glued onto the natural nail by using an adhesive. However, forcing the artificial nails to conform to the contours of the natural nails means the artificial nails are always seeking to return to their original shape. As a result, not-properly-fitted artificial nails lift up and peel off easily and quickly. In addition, improperly fitted artificial nails leave a space between themselves and the natural nails, which creates an area where bacteria and fungus can potentially develop.

In view of the foregoing, it would be desirable to have a system and process to create custom-fit artificial nails quickly and easily without compromising the health of both the user and the nail technician. U.S. Pat. No. 7,123,983 titled "System and Process for Creating Custom Fit Artificial Fingernails Using a Non-Contact Optical Measuring Device" to Yogo et al. uses an optical 3D measuring device to digitize the topographical configuration of a natural nail surface and then an artificial nail is digitally designed. This system uses a computer numerical controlled ("CNC") machine to mill out each artificial nail. This direct CNC machining method can ensure proper-fit but is still very time consuming, costly and requires considerable work to turn a machined piece into the final artificial nail. In addition, it is also not desirable to perform the CNC machining in a nail salon environment and usually an off-site machining center is needed. As a result, a user cannot have the artificial nails done on-site right after the measuring and has to wait for shipping of the custom-fit artificial nails. Therefore, there is a need for a way to create custom-fit artificial fingernails without these limitations and potential problems.

SUMMARY OF THE INVENTION

The present invention provides a system and method for easily, safely and effectively creating custom-fit artificial nails. First, the topographical information of a natural nail, such as the width, height, length and arc of the nail surface, is obtained. Preferably, the topographical information of a natural nail is obtained by measuring the natural nail directly. In a preferred embodiment of the invention, the measurement can be done by a non-contact optical device to generate a 3D point cloud data with known coordinates in the X, Y, and Z axis, which accurately represents a natural nail surface shape in 3D. Secondly, artificial nail parameters, such as but not limited to color, length, thickness and tip style, are provided. Based on the natural nail measurement data including topographical information and the provided parameters for the artificial nail, a nail blank object is selected from a collection of pre-made nail blank objects. The pre-made nail blank objects are mass-produced using various materials and can have different colors and surface treatments. The nail blank objects are already formed, usually by injection molding, into a shape similar to a natural nail but with very limited choice of sizes and shapes. This is called primary shaping. In a preferred embodiment of the invention, a typical set of nail blank objects has only ten (10) graduated shapes and sizes to choose from. Therefore, it is anticipated that a pre-made nail blank object does not fit properly a natural nail.

In order to properly fit a nail blank object onto the natural nail, it is necessary to change the original shape of the nail blank object into a new shape which substantially matches the contour of the specific natural nail. This is accomplished by a secondary shaping process using a thermoforming method with appropriate tooling. The thermoforming system includes matching positive and negative molds that are brought together with a nail blank object in-between. While in the mold, heat is applied to the nail blank object, thus forcing/stretching the nail blank object onto the mold surface and transform it into a new specific shape defined only by the mold. The matching positive and negative molds, which are referred as nail tooling hereinafter, can be pre-made by using CNC milling on metal materials with various configurations such as different sizes and shapes to form a library of nail tooling sets. In a preferred embodiment, a library of nail tooling includes twenty-five (25) different configurations. By using the measurements including topographical information of a natural nail, one can always find an appropriate nail blank object to use along with appropriate nail tooling to produce a final shape which closely matches the shape of the natural nail. The combination of different nail blank objects and different nail tooling options provides an ability to produce much more possible sizes and shapes of artificial nails having a custom fit to a natural nail. For example, ten (10) different nail blank objects and twenty-five (25) different nail toolings can create a total of two hundred and fifty (250) possible combinations. The dramatic increase in number of possible sizes and shapes of artificial nails ensures a proper fit for each of a wide variety of natural nail shapes, sizes and contours.

Thus, a system and method is provided for quickly and accurately creating custom-fit artificial nails by introducing a secondary shaping process to pre-made nail blank objects by using a thermoforming method with a selection of options for nail tooling that corresponds to the contour of a variety of natural nails. The system offers the advantage of safely producing custom-fit artificial nails on-site, which fit properly on a user's natural nails within a short period of time. The system is advantageously small and suitable for use inside a nail salon.

Other objects and features of the present invention will become apparent when viewed in light of the detailed description of the preferred embodiments when taken in conjunction with the attached drawings and appended claims. However, it is to be understood that the drawings are not necessarily drawn to scale and are designed solely for purposes of illustration and not as a definition of the limits of the invention.

BRIEF DESCRIPTION OF THE DRAWINGS

The novel features of the present invention, as well as the preferred embodiments of the present invention, both as to system and method, will be best understood from the accompanying drawings, taken in conjunction with the accompanying description, in which similar reference characters refer to similar parts, wherein:

FIG. 1 is a diagrammatic view schematically illustrating a preferred embodiment of the artificial nail manufacturing system of the present invention;

FIG. 2 is a three-dimensional view of applying an artificial nail to a natural nail;

FIG. 3 is a perspective view of an artificial nail;

FIG. 4 is a sectional view of the artificial nail along its nail length direction;

FIG. 5 is a sectional view of the artificial nail along its nail width direction;

FIG. 6 is a top view of a set of nail blank objects in graduated sizes;

FIG. 7 is a parameter table showing various configurations of a set of nail blank objects;

FIG. 8 is a cross-sectional view along the nail width direction showing an un-fitted artificial nail on top of a natural nail;

FIG. 9 is a cross-sectional view along the nail width direction showing a properly fitted artificial nail on top of a natural nail;

FIG. 10 is a cross-sectional view along the nail width direction showing an un-fitted artificial nail on top of a natural nail;

DETAILED DESCRIPTION OF THE INVENTION

Figure 11:
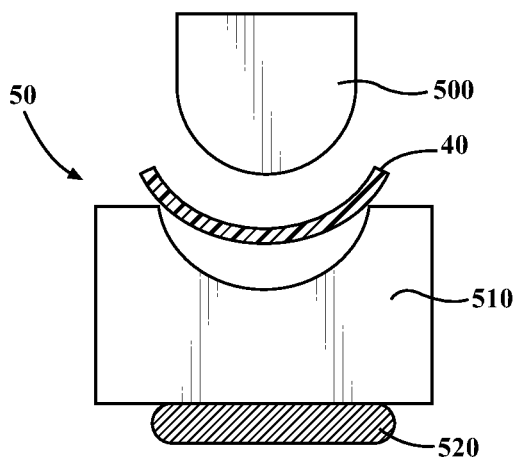
FIG. 11 is a cross-sectional view along the nail width direction showing a nail blank object being placed into a nail tooling.

The following description of the preferred embodiments is merely exemplary in nature and it in no way intended to limit the invention, its application or uses. Those skilled in the art will recognize various alternative embodiments.

Referring to FIG. 1, an artificial nail manufacturing system 10 of the present invention comprises a measuring device 20 for measuring the shape, size and topographical contour of a natural nail 30. In a preferred embodiment, measuring device 20 is a nail gauge. The nail gauge is of the type identified in U.S. patent application Ser. No. 13/731,179, titled "Nail Gauge for Measuring Nail Shape and Nail Arc Length" to Li et al. and incorporated herein by reference. Other suitable measuring devices known to those skilled in the art may be used in place of the nail gauge. Data from measuring device 20 is used in selecting a suitable nail blank object 40. Nail blank object 40 is an artificial nail that is modifiable according to the teachings of the invention to custom fit the natural nail 30. As will be explained, there are available a plurality of different shapes and sizes of nail blank objects. Nail blank object 40 is placed in molding device 50 for heat activated forming of an in-process nail blank object 40a. As will be explained, there are available a plurality of different shapes and sizes of molds (also referred to as "tooling") that are suitable for use in molding device 50. The artificial nail manufacturing system 10 thus produces custom-fit artificial nails 40b, 40c, 40d, 40e of varying shapes and sizes to custom fit a variety of different shapes and sizes of natural nails.

With added reference to FIGS. 2-5, in order to properly attach an artificial nail 100 onto a finger 110 with a natural nail 120, the size and shape of the artificial nail has to match the corresponding natural nail. As shown in FIG. 3, an artificial nail body has a proximate edge 200 intended to be the same shape as the cuticle of a natural nail, a distal edge 210 which is intended to extend beyond the fingertip of a wearer, a first side edge 220, and a second side edge 230. Artificial nail also has an underside 240 that at least a portion of which will contact the natural nail. As seen in reference to FIGS. 4-5, similar to a natural nail, the artificial nail 100 has a curved form with a curvature 250 between two side edges and a curvature 270 between the proximate and distal edges. The straight-line distance between the two side edges 220, 230 is called the width of nail 280. The straight-line distance between the proximate edge 200 and the distal edge 210 is called the length of nail 290. The arch height 260 of an artificial nail refers to the distance from the highest point on the top surface to the plane that intersects the side edges 220, 230 of the artificial nail.

In order to properly fit, the width, arch height and curvatures of the artificial nail has to match the corresponding dimensions of the natural nail. It is well known that the width, arch height and curvatures of a natural nail vary greatly between persons and even between different fingers on the same person. The pinky nails usually are more curved and the nails on index fingers and thumb fingers are generally flatter. Males usually have bigger but relatively flatter nails and females generally have smaller but more arched nails.

Referring to FIG. 6 as an example, one set of artificial nail blanks 300 has ten injection-molded nail blank objects 300a, 300b, 300c, 300d, 300e, 300f, 300g, 300h, 300i, 300j as options for fitting on a natural nail. In order to distinguish the different sizes, these nail blank objects are numbered from 0 to 9. By way of example only, the configurations corresponding to the numerical designations of different nail blank objects are shown in FIG. 7. Nail blank objects are usually manufactured by injection molding with thermoplastic materials, such as, by way of example only, acrylonitrile butadiene styrene ("ABS"), polyethylene ("PE"), polyvinyl chloride ("PVC"), polyethylene-terephthalate ("PET") and combinations thereof, as disclosed in U.S. Pat. No. 7,143,770 titled "Injection Molded Artificial Nails and Packaging Thereof" to Keller on Dec. 5, 2006, and incorporated herein by reference.

If attaching one of the nail blank objects (300a-300j) onto a natural nail, there are three possible outcomes. With added reference to FIG. 8, the nail blank object 310 is too curved to be properly put on the natural nail 120 and a gap is formed in between. With added reference to FIG. 9, the nail blank object 320, which has the right curvature, fits properly on a natural nail 120 and leaves no gap in between. With added reference to FIG. 10, the nail blank object 330, which is relatively too flat, does not fit properly on the natural nail 120 and leaves a gap between them. In prior practice, an un-fitted artificial nail is usually forced onto a natural nail by using an adhesive. As a result, the artificial nail always seeks to return to its initial shape. An un-fitted artificial nail blank lifts up and peels off easily and quickly or is too tight and uncomfortable for the user. In addition, a space between an artificial nail and a natural nail creates an area where bacteria and fungus may potentially develop.

Figure 12:
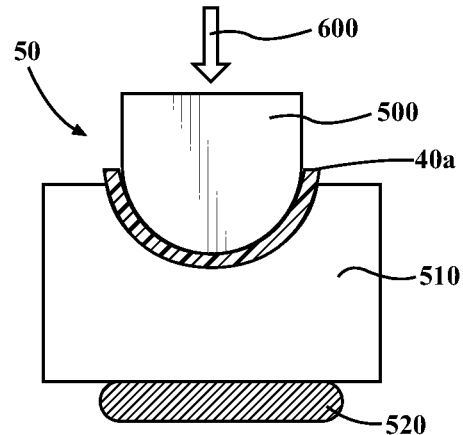
FIG. 12 is a cross-sectional view along nail width direction showing the nail blank object being deformed by thermoforming process.
Figure 13:
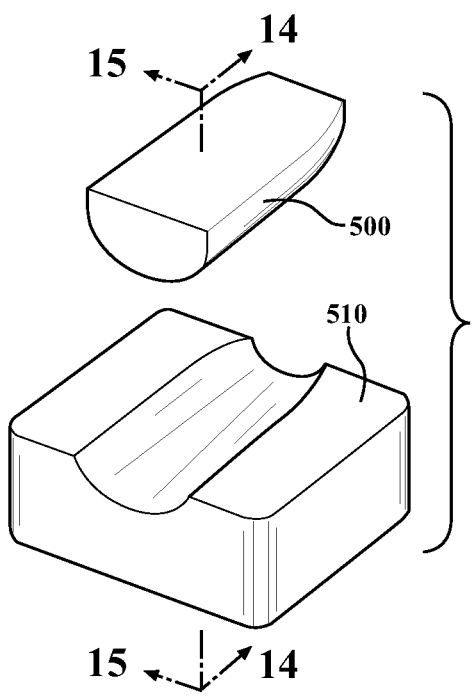
FIG. 13 is a perspective view of a nail tooling.
Figure 14:
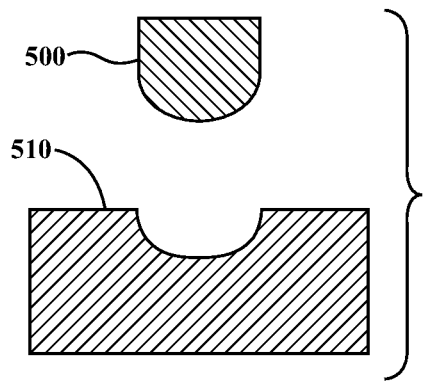
FIG. 14 is a cross-sectional view of the nail tooling along nail width direction.

In accordance with the invention, in order to provide a proper fit to a user's natural nails, a secondary shaping process is introduced to the nail blank objects by using a thermoforming method with appropriate tooling. Referring to FIGS. 11-15, molding device 50 includes nail tooling including a positive mold 500 and a negative mold 510. After a nail blank object 40 is placed inside the nail tooling, an electrical heating source 520 located under the negative mold is used to heat up the nail blank object 40 towards its pliable forming temperature. Different materials have different pliable forming temperatures and generally they are in the range of 70° C.-200° C. With the temperature rising, a nail blank object becomes softened. Referring to FIG. 12, during or at the end of the heating cycle, the positive mold 500 and negative mold 510 are brought together to force the heated in-process nail blank object 40a to assume the mold shape by applying a directed force 600, as shown. After a cooling cycle brings down the temperature, the reformed nail blank object keeps its newly formed shape and this accomplishes the secondary shaping process.

Figure 15:
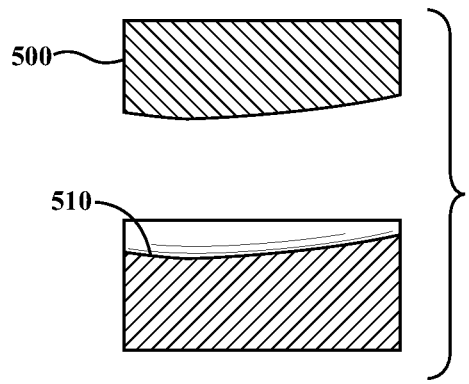
FIG. 15 is a cross-sectional view of the nail tooling along nail length direction.
Figures 16, 17:
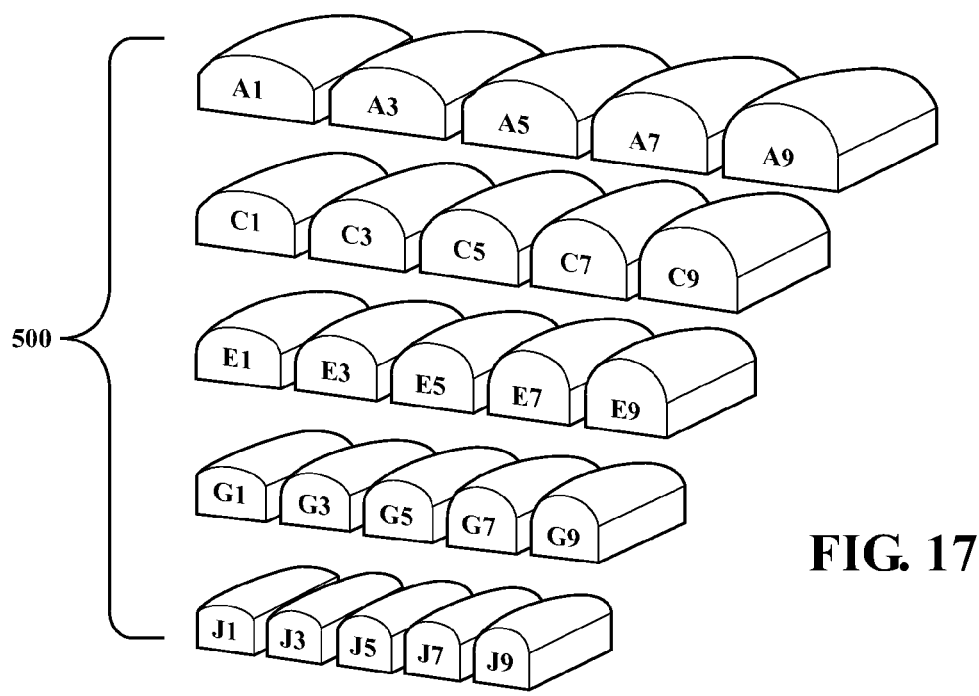
FIG. 16 is a parameter table showing various configurations of a library of nail toolings.
FIG. 17 is a perspective view of a library of nail tooling (only the positive mold showing)

Similar to a natural nail, the nail tooling is in a curved form with a curvature between two side edges and a curvature along the nail length direction. Referring to FIG. 15, by way of example only and by no means as a limitation, nail tooling combinations of varying widths (W), arch heights (H) and curvatures (R), are maintained in a desirable library with each nail tooling being assigned a code, such as "J5" etc. This library of nail tooling can have the curvatures (R) ranging from 4.0 to 11.8 mm, widths (W) ranging from 8 to 17 mm, and arch heights (H) ranging from 1.7 to 6.8 mm. Referring to FIG. 17 a nail tooling library 500, corresponds to different configurations listed in FIG. 16 (with only the positive molds displayed in FIG. 17). The combination of such a nail tooling library and different sizes of nail blank objects dramatically increases the possibility of finding a match to a natural nail and provide for creating a truly custom-fit artificial nail.

Figure 18:
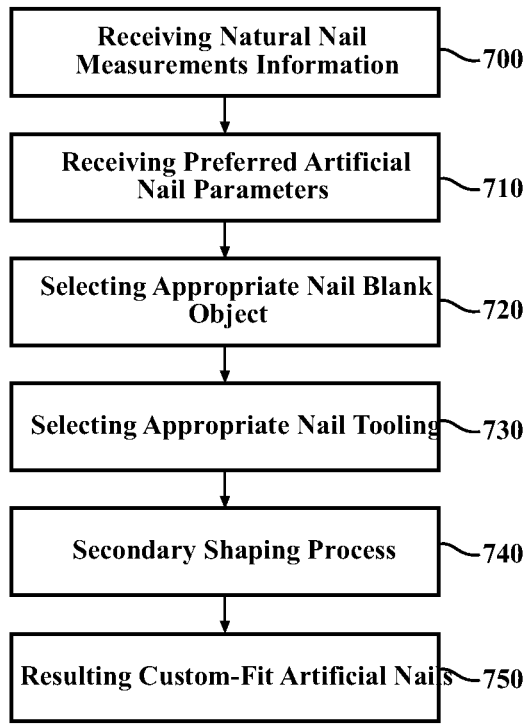
FIG. 18 is a flow diagram of the method of the present invention including secondary shaping of the nail blank objects.

Referring to FIG. 18, a method for manufacturing customfit artificial nails according to a preferred embodiment of the invention includes a first step of receiving measurement information 700 for a natural nail including the natural nail's topographical information. In brief reference back to FIGS. 4-5, the natural nail size and topographical information needed is the curvature 270, width 280, arch height 260 and curvature 250. There are several ways to obtain natural nail size and topographical information, for example as explained in reference to FIG. 1 a mechanical method uses a measuring device 20 to measure the natural nail. Alternatively, measuring device can be a probe to contact the natural nail surface and take measurements as disclosed in U.S. Pat. No. 5,309, 365 titled "System for Cutting Artificial Nail Tips and for Decorating the Same or Existing Nails Using Automated Cutting Processes" to Sullivan et al. on May 3, 1994, incorporated herein by reference.

In another preferred embodiment, the natural nail is measured by a non-contact 3D optical device as disclosed in U.S. Pat. No. 7,123,983 titled "System and Process for Creating Custom Fit Artificial Nails Using a Non-Contact Optical Measuring Device" to Yogo et al. on Oct. 17, 2006, and incorporated herein by reference. By using an optical device, the natural nail is first digitized into point cloud data, which are data points in 3D space with known coordinates in the X, Y and Z axis and these data points represent the 3D topography of the measured nail. With additional reference to FIGS. 20-23, the point cloud data 900 obtained from the optical device is typically in a wireframe format and includes X, Y and Z values for data points on the natural nail. This includes data for the natural nail's width 910, curvature 920, arch height 930 and curved profile 940.

Referring back to FIG. 18, the dimensions (910, 930, 920 and 940), which are calculated from the nail point cloud data 900, can then be used to find the best match in the combination of parameters for one of the available nail blank objects (as referenced in FIG. 7). However, due to limited choice of the size and shape of nail blank objects, even with this best match the nail blank object may not be able to properly fit the natural nail. It should be understood that natural nail topographical information can also be obtained from the experience of a skilled nail technician and/or taking simple measurement by using physical templates of different curvatures, widths and arch heights.

As a next step in the method, dimensions (910, 930, 920 and 940) are used again to select an appropriate nail tooling from the library of nail toolings (as discussed in reference to FIGS. 16-17). Since the nail tooling library provides several choices, especially for the nail curvature, it is possible to find appropriate nail tooling to use in the secondary shaping step 740 to bring the size and shape of a nail blank object much closer to that of a natural nail. The outcome of the secondary shaping step is a custom-fit artificial nail 750. The manufacturing method also provides for selecting parameters 710 for the artificial nail including built-in colors and tip styles.

Figure 19:
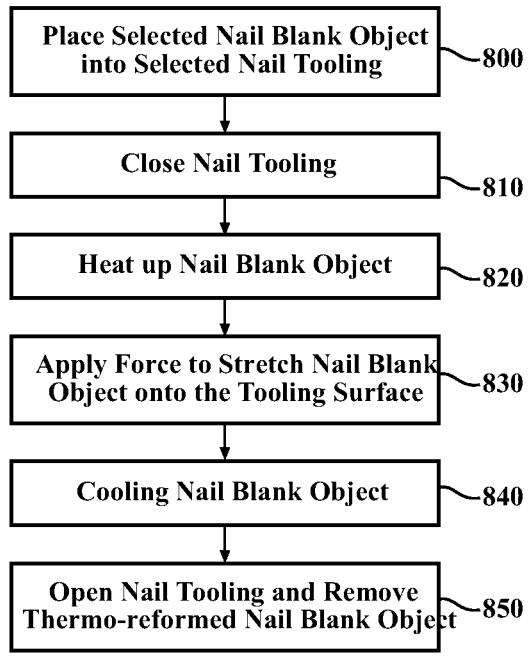
FIG. 19 is a flow diagram of the thermoforming process used in the secondary shaping of nail blank objects of the present invention.
Figure 20:
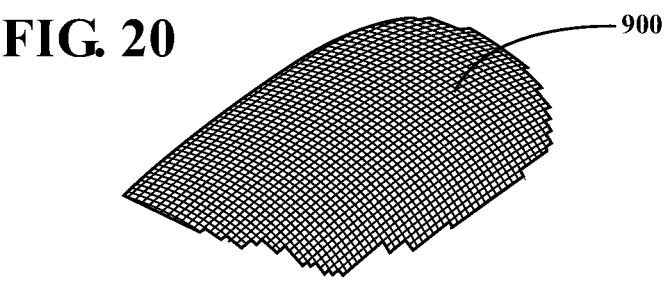
FIG. 20 is a perspective view of measurement data taken by an optical 3D measurement device on a natural nail.
Figure 21:
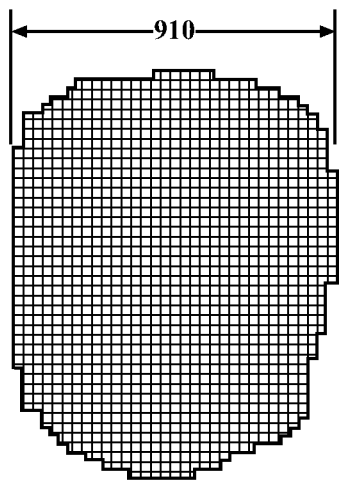
FIG. 21 is a top view of measurement data taken by an optical 3D measurement device on a natural nail.
Figure 22:
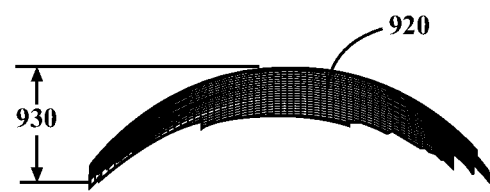
FIG. 22 is a cross-sectional view along the nail width direction of measurement data taken by an optical 3D measurement device on a natural nail.
Figure 23:
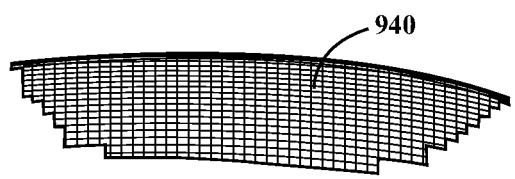
FIG. 23 is a cross-sectional view along the nail length direction of measurement data taken by an optical 3D measurement device on a natural nail.

Referring to FIG. 19, the process of thermoforming includes placing a selected nail blank object into a selected nail tooling 800. Next, the nail tooling is half-closed by using a force 810. At this moment, the nail tooling is not completely closed. In the next step 820, a heating cycle starts. After the heating cycle starts, in the next step 830, the nail tooling is completely closed to force the nail blank object to change its shape inside the nail tooling. In the next step 840, a cooling cycle starts to bring down the temperature below 40° C. Finally, in the last step 850, the nail tooling is opened and the thermo-molded nail blank object is removed.

Figure 24:
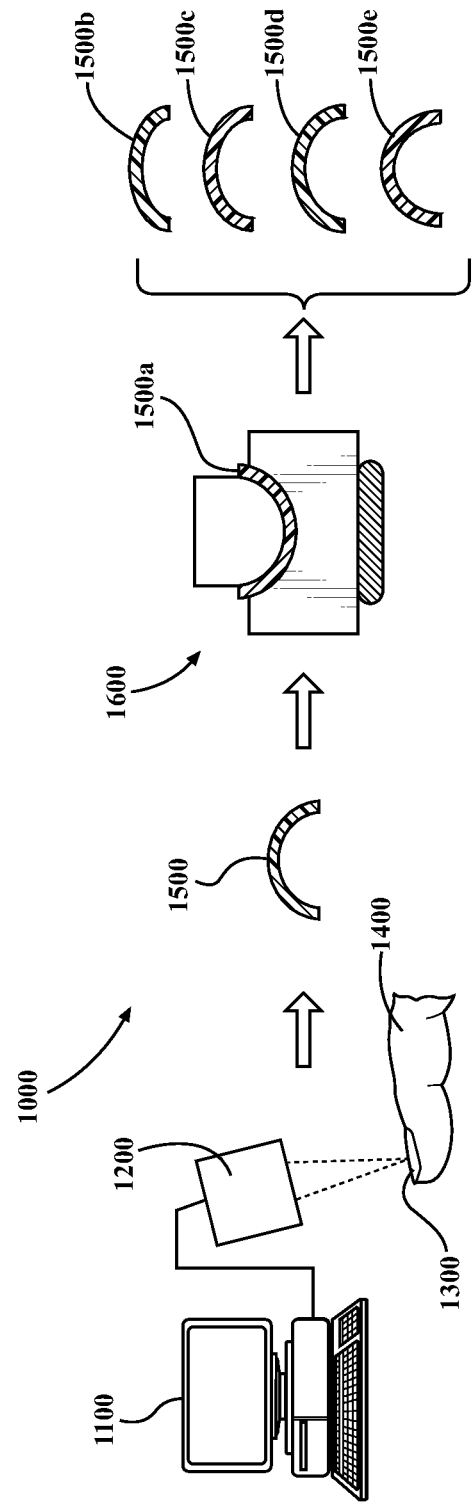
FIG. 24 is a diagrammatic view schematically illustrating an alternative preferred embodiment of the artificial nail manufacturing system of the present invention.

Referring to FIG. 24, an alternative preferred embodiment of the artificial nail manufacturing system 1000 of the present invention comprises a computer 1100 connected to a non-contact measuring device 1200 for measuring the shape and size of a natural nail 1300 of a finger 1400. The computer 1100 includes a display, keyboard, input device (mouse), memory, processor, data storage device, operating system software and database system software of the type known to those skilled in the art. Computer 1100 stores information about the set of available nail blank objects, as previously disclosed in relation to FIGS. 6-10. In addition, computer 1100 stores information about available nail tooling, as previously disclosed in relation to FIGS. 16-17.

Computer 1100 is used to activate non-contact scanning of the natural nail 1300 and records the digitized data points corresponding with X, Y and Z axis data points for the nail's shape including 3D topography and size of the natural nail 1300. These data points are then used by the computer's software, in a way known to those skilled in the art, to determine the most closely matching nail blank object 1500 to match the natural nail 1300. Computer 1100 also determines the best nail tooling to use in the secondary step of thermoforming of the selected nail blank object. Thus, computer 1100 assists in both the measurement of a natural nail and in selecting the best matching of the nail blank objects and nail tooling of the options available for creating a custom fit artificial nail. Computer may also include an ability to display models of artificial nails and allow for maintaining an inventory of available artificial nail options.

As already disclosed in relation to FIGS. 1, 11-15, the selected nail blank object 1500 is placed in molding device 1600 for heat activated forming of an in-process nail blank object 1500*a*. The artificial nail manufacturing system 1000 thus produces custom-fit artificial nails 1500*b*, 1500*c*, 1500*d*, 1500*e* of varying shapes and sizes to custom fit a variety of different shapes and sizes of natural nails.

In another alternative preferred embodiment of the invention, computer 1100 is also connected to molding device 1600 (connection not shown) to provide for controlling the heating time and heating profile during thermoforming the nail blank object.

Preferred embodiments of present invention are described by way of illustration rather than limitation. Variations of these preferred embodiments may become apparent to those of ordinary skill in the art upon reading the foregoing description. Such variations that do not depart from the gist of the invention are intended to be within the scope and of the invention. The inventors expect skilled artisans to utilize such variations as appropriate, and the inventors intend for the invention to be practiced otherwise than as specifically described herein.

What is claimed is:

1. A process of manufacturing a custom-fit three-dimensional artificial nail comprising the steps of:
   receiving topographical information for a natural nail;
   receiving customer preferred parameters for an artificial nail wherein the parameters include at least one of an artificial nail color, an artificial nail length, an artificial nail thickness and an artificial nail tip style;
   selecting an appropriate artificial nail blank from a mass-produced collection of nail blank objects by using nail topographical information and preferred artificial nail parameters;
   selecting appropriate nail tooling from a library of pre-made nail tooling by using nail topographical information;
   manufacturing custom-fit three-dimensional artificial nails by applying heat to the selected nail blank object and forcing it to stretch onto the nail tooling surface to form into a new specific three-dimensional shape which matches the topography of at least a portion of the natural nail top surface.

2. The manufacturing process of claim 1 wherein said custom-fit three-dimensional artificial nails comprise a semi-rigid nail body having a proximate edge, a distal edge, a left side, a right side, a top surface and an under surface wherein at least a portion of the under surface substantially matches the top surface of the natural nail.

3. The manufacturing process of claim 1 wherein said custom-fit three-dimensional artificial nails are made from thermoplastic materials.

4. The manufacturing process of claim 1 wherein said nail topographical information refers to data useable for describing the topography of the natural nail top surface.

5. The manufacturing process of claim 1 further comprising obtaining said nail topographical information by measuring the natural nail with a non-contact measurement technology.

6. The manufacturing process of claim 1 further comprising the steps of:
   placing a selected nail blank object into the selected nail tooling;
   heating up the nail blank objects to a certain temperature to soften the nail blank material;
   applying force to close the nail tooling to stretch the nail blank object onto the tooling surface to form into a new specific 3D shape; and
   cooling the nail blank object and hardening into the new finished 3D shape.

\* \* \* \* \*